Figure 1:
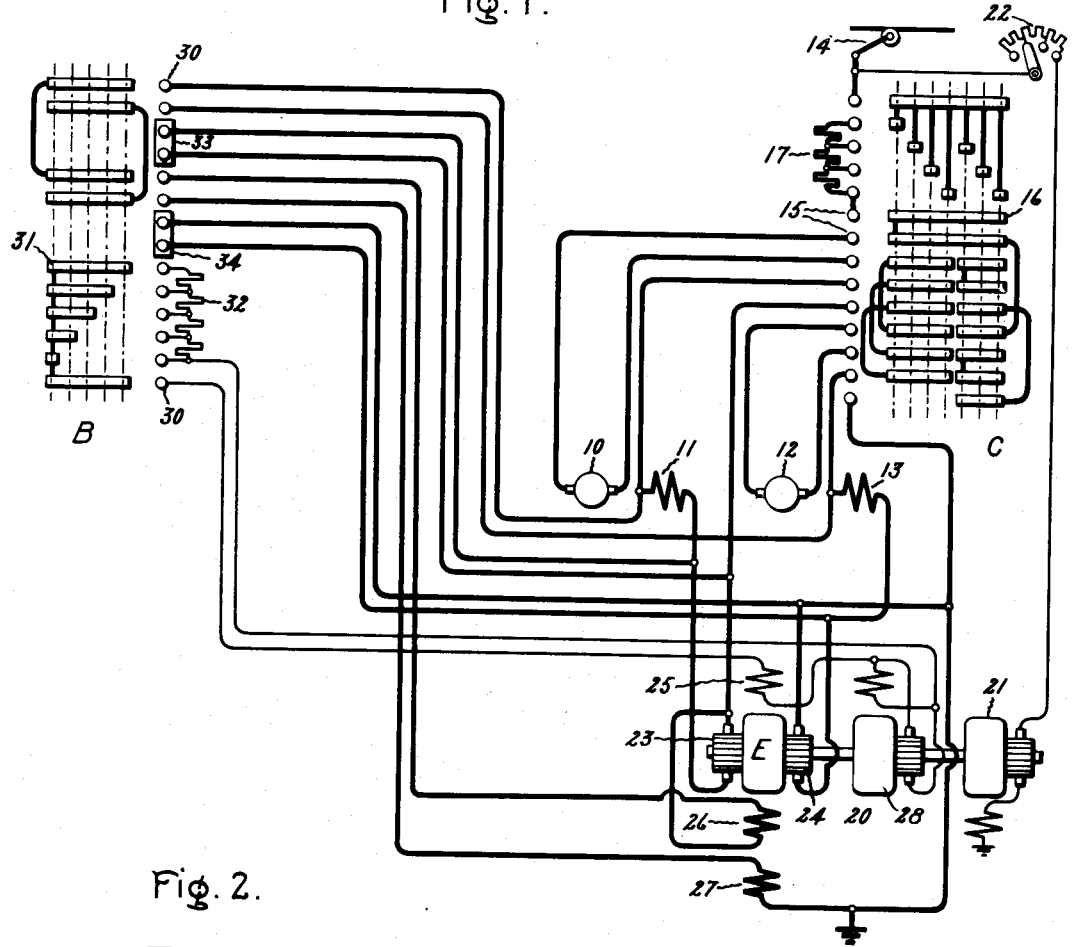

E. F. W. ALEXANDERSON.
ELECTRICAL SYSTEM OF POWER TRANSMISSION.
APPLICATION FILED APR. 22, 1916.

Patented June 4, 1918.

Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION.

1,268,662.  Specification of Letters Patent.  Patented June 4, 1918.

Application filed April 22, 1916. Serial No. 92,860.

*To all whom it may concern:*

Be it known that I, ERNST F. W. ALEXANDERSON, a citizen of the United States, residing at Schenectady, county of Schenectady, State of New York, have invented certain new and useful Improvements in Electrical Systems of Power Transmission, of which the following is a specification.

My invention relates to electrical systems of power transmission and particularly to systems of regenerative braking comprising a dynamo-electric machine and a source of current adapted to be connected to a field winding thereof.

In my Patents Nos. 940,112 and 996,390, I have shown two arrangements for utilizing an independent source of excitation for the field windings of series dynamo-electric machines, which normally function as series motors, to cause them to operate as generators to produce regenerative braking. In my application Serial No. 83,659 filed March 11, 1916, assigned to the same assignee as this application, I have pointed out how the series speed-current characteristic of the dynamo-electric machines, when operating as motors, may be retained while they are acting as braking generators by a certain method of operation. In that application, I have utilized as an independent source an exciter provided with a series field winding connected to carry the armature current of the dynamo-electric machine.

Now, regardless of whether the exciter armature is connected in shunt to the field winding of the dynamo-electric machine, as shown in my Patent No. 940,112, and shown in the application to which I have referred, or is connected in series therewith, as shown in my Patent No. 996,390, it will be seen that there is a path of low inductance and low resistance between the trolley and ground, which, in case of momentary interruptions of the trolley circuit, such as are sometimes caused by the presence of sleet on the trolley wire, would allow rushes of current when the trolley comes back in contact with the trolley wire. Such current rushes might cause a flash-over of the commutator of either the dynamo-electric machine or exciter, which would be harmful.

An object of my invention is to provide improved means for preventing harmful current rushes when, during the generator operation of a dynamo-electric machine, the connection between the dynamo-electric machine and power circuit, to which it delivers current, is restored after having been momentarily interrupted, as occurs, for example, in traction service with an "arcing trolley."

I have found that this object will be fulfilled if I so dispose the series field winding for the exciter of my copending application that it will serve as a reactance in the low resistance, low inductance circuit to which I have referred. With such an arrangement, the series field winding will carry the sum of the currents in the armature and field winding of the dynamo-electric machine or machines during the generator operation thereof, and may be utilized as a substitute for a portion or all of the differential series field shown in my copending application.

Another object of my invention is to provide an improved system of control for a series dynamo-electric machine which, during its generator operation, has an exciter connected to its field winding.

Other objects of my invention will appear as the specification proceeds.

My invention will best be understood by reference to the accompanying drawings, in which my invention is illustrated as applied to a system of regenerative braking and in which :—

Figure 2:
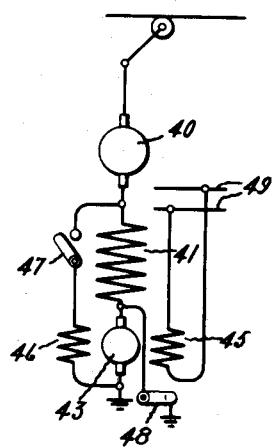
Figure 3:
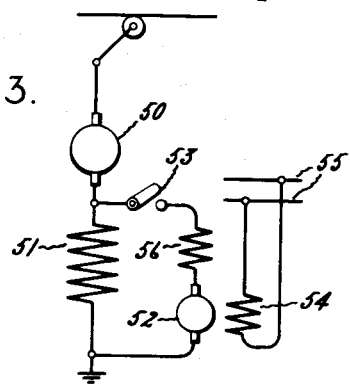

Figure 1 is a diagram showing an arrangement of apparatus embodying my invention; Fig. 2 is a simplified diagram of the connections shown in Fig. 1; Fig. 3 is a simplified diagram of a modification.

Because of the resulting decrease in the size of the independent source, which I shall call the exciter, when the same is connected in series with the traction motor field in the manner shown in my Patent No. 996,390, I have preferred to illustrate this arrangement in the principal figure. Thus, in Fig. 1 I have shown a pair of dynamo-electric machines, which in view of their normal function will be generally referred to hereinafter as traction motors or simply motors, having armatures 10 and 12 and series field windings 11 and 13. Power is supplied to these motors from some convenient source, such, for example, as the trolley 14. For the purpose of controlling these motors and connecting them either in series or in parallel, there is provided a main controller C, which may be of any suitable form or arrangement, and is here illustrated as comprising fixed contacts 15, associated with which are moving contacts 16 which will ordinarily be mounted upon a rotating drum in the controller. Associated with the controller is a starting resistance 17. Movement of the drum of the controller carrying the contacts 16 will effect in regular sequence various connections whereby power will be supplied to the motors through the starting resistance 17, and they will be accelerated until they are finally connected either in series or in parallel, without the inclusion of any of the starting resistances. It should be here noted that the controller as illustrated keeps the field windings 11 and 13 upon the ground side of the armature. While this is not essential to my invention, it will be found preferable in cases where the trolley potential is considerable, in order to relieve the insulation strain upon the field windings.

For the purpose of utilizing the traction motors for regenerative braking, there is provided a motor generator set 20, which is driven by means of a motor 21 supplied with power from the trolley 14 through the starting resistance 22. Driven by this motor, and here shown as mounted on the same shaft, is a generator, which I shall for convenience term an exciter E. This machine is illustrated as a double commutator machine provided with commutators 23 and 24, which are adapted to be connected in a local circuit with the field windings 11 and 13 of the traction motors. It will be understood that the armature circuits connected to the commutators 23 and 24 are electrically independent, and are simply mounted upon the same rotor for convenience. This exciter E is provided with a shunt field winding 25 and with series field windings 26 and 27, the purpose of which will be later explained. These series windings 26 and 27 are arranged so that they are cumulative with the shunt winding 25, but, owing to the reversal of current in the series windings during regenerative braking, they then become differential to the shunt winding. Current for the excitation of the shunt winding is supplied by means of the control generator 28, preferably forming a part of the same motor generator set 20.

In addition to the main controller C, I have provided a so-called braking controller B, which may be of a similar construction to the main controller, and comprises fixed contacts 30 and moving contacts 31, by means of which the exciter armature windings may be connected in a local circuit with the traction motor field windings, and the shunt field winding of the exciter supplied with a current for excitation which may be adjusted, to alter the excitation of the traction motor fields, in any suitable manner, as, for example, by including more or less of the resistance 32 in circuit with said shunt field winding 25. In the off position of the controller B, the exciter armatures are short-circuited by means of moving contacts 33 and 34, thereby reducing the heating of these armature windings. It will be noted that the field windings 25, 26 and 27 are then open-circuited, thus removing all excitation from the exciter.

A locomotive to which the apparatus illustrated in Fig. 1 may have been applied can then be accelerated from standstill by manipulation of the main controller C, and can be operated, according to external conditions, with the motors connected either in series or in parallel. Although I have herein illustrated my invention as applied to two traction motors, it will be understood that it is in no wise limited, and that the particular illustration employed is simply for convenience, in order to avoid complicating the drawing.

If, now, it is desired to begin braking operations, the motor generator set, if it is not already running, will be started by means of the rheostat 22, and the braking controller B will be moved to its first position, whereby the exciter armatures 23 and 24 are each connected in a local circuit with one of the field windings 11 and 13. As I have already pointed out, by reference to my previous Patents #940,112 and 996,390, it is not at all essential that the exciter shall be connected in series with the field windings, as herein shown, but it is only necessary that they be connected in a local circuit in any manner,—as, for example, that shown in the earlier patent.

The resistance 32 is preferably so designed that, when the braking controller B is moved to its first operating position, the field winding 25 will produce just such voltage at the exciter brushes that there will be practically no change in the excitation of the traction motor fields 11 and 13. Further movement of the braking controller will gradually increase the excitation applied to the shunt field winding 25 by short-circuiting sections of the resistance 32, and will thereby increase the voltage at the exciter terminals so that a flow of current will result in the local circuits, including the traction motor fields. This will strengthen the motor field excitation and increase their counter-electromotive force until the flow of current is reversed and the motors become braking generators which are delivering power to the line.

The operation may be more readily explained by reference to the simplified diagrams in Figs. 2 and 3. In Fig. 2 there is shown an arrangement the same as in Fig. 1, for a single motor and a single exciter. Here the traction motor has an armature 40 and a field winding 41, in series with which is the exciter armature 43. This exciter is supplied with a shunt field winding 45, supplied with any desired current from buses 49, and a series field winding 46 in shunt to the exciter armature 43 and the motor field winding 41. This local circuit through the series field winding 46 is adapted to be closed by means of a switch 47, while a switch 48 is provided for short-circuiting the exciter armature 43 during motoring.

In the arrangement shown in Fig. 3, the traction motor has an armature 50 and a field winding 51 connected in series to the source of supply. In shunt with the field 51 is the exciter 52, a switch 53 being provided for closing the local circuit during braking, and this exciter is provided with a shunt field winding 54, supplied with any desired current from the buses 55, and a series field winding 56 connected in the local circuit in series with the exciter armature.

After regenerative braking operation has been attained the regenerated current will flow, in the arrangement of Fig. 2, from ground through the series winding 46, the switch 47, and the armature 40, to trolley. In addition, there will be a flow of current in the same direction in the local circuit, including the field winding 41, the exciter armature 43, the series winding 46, and the switch 47. With the arrangement of Fig. 3, the regenerated current will flow from ground through the exciter armature 52, the series field 56, the switch 53, and the traction motor armature 50, to trolley. In addition, current will flow in the same direction in the local circuit formed by the field winding 51, the exciter armature 52, the series field 56, and the switch 53.

It results, therefore, that with the arrangement of Fig. 2 the exciter armature may be materially smaller than with the arrangement of Fig. 3, for the reason that it is carrying only the current which flows through the traction motor field winding, whereas in the arrangement of Fig. 3 the exciter armature 52 is carrying not only the traction motor field current, but also the traction motor armature current.

With either arrangement, however, regenerative braking may be readily effected and easily controlled by simply varying the excitation of the shunt field winding of the exciter. At the same time, owing to the use of a series winding 46 or 56 for the exciter, which winding is carrying the sum of the motor armature and field currents, any variation in motor armature current will produce a corresponding variation in the excitation of the exciter, and hence in the excitation of the motor field winding. It, therefore, follows that during regeneration the traction motors will have a speed current characteristic similar to their speed current characteristics during motoring, with a resulting flexibility and softness of operation.

It will be noted that if the series field winding be omitted from either the arrangement of Fig. 2 or that of Fig. 3, there will be a non-inductive path between trolley and ground, which, in case of momentary interruptions of the trolley circuit, as by an arcing trolley, would allow rushes of current when the trolley comes back in contact with the trolley wire. If, however, the series field windings 46 and 56 are included in this circuit of low inductance and low resistance, then said field windings will serve a double purpose, and act as reactances as well as to give the arrangement a series characteristic.

While I have herein shown certain specific arrangements of my invention, it will be understood that various modifications can readily be made, and I seek, therefore, to cover in the appended claims all those modifications and variations which come within the true scope and spirit of my invention.

What I claim as new and desire to secure by Letters Patent of the United States, is:—

1. A regenerating braking system, comprising a series traction motor, an exciter arranged to control the excitation of the field winding of said motor, a shunt circuit around said field winding, and a reactance in said shunt circuit comprising a field winding for said exciter.

2. In combination, a dynamo-electric machine having a field winding in series with its armature, an exciter armature and a field winding therefor connected in series with each other, and a local circuit comprising said first mentioned field winding and said exciter armature with its series field.

3. In a regenerating braking system, the combination with a dynamo-electric machine, having a field winding and adapted to operate alternatively as a motor or as a generator, of an exciter arranged to control the excitation of said dynamo-electric machine, said exciter having a field winding which is so arranged and connected that it carries the sum of the currents in the armature and field winding of said dynamo-electric machine during the generator operation thereof.

4. In a regenerating braking system, the combination with a dynamo-electric machine, having a field winding and adapted to operate alternatively as a motor or as a generator of an exciter arranged to control the excitation of said dynamo-electric machine, said exciter having a separately excited winding and a field winding which is so arranged and connected that it carries the sum of the currents in the armature and field winding of said dynamo-electric machine and that it acts differentially with respect to said separately excited field winding during the generator operation of said dynamo-electric machine.

5. In combination, a source of supply, a dynamo-electric machine having a field winding in series with its armature, one side of said armature being connected to one side of said source of supply, an exciter armature and a field winding therefor connected in series with each other, a local circuit comprising said first mentioned field winding and said exciter armature with its series field winding and a connection to the other side of said source of supply from a point intermediate said exciter armature and its series field winding.

6. In combination, a series traction motor, an exciter arranged to control the excitation of the field winding of said motor and connected in series therewith, a shunt circuit around said field winding and exciter, and means for substantially simultaneously opening said shunt circuit and short-circuiting said exciter.

7. In combination, a series traction motor, an exciter arranged to control the excitation of the field winding of said motor and connected in series therewith, a shunt circuit around said field winding and exciter, and means for substantially simultaneously removing the field excitation of the exciter and short-circuiting the exciter.

In witness whereof, I have hereunto set my hand this 18th day of April, 1916.

ERNST F. W. ALEXANDERSON.